United States Patent
Berge et al.

(10) Patent No.: US 10,663,762 B2
(45) Date of Patent: May 26, 2020

(54) DIELECTRIC ELECTRO-ACTIVE POLYMER CONTACT LENSES

(71) Applicant: International Business Machines Corporation, Armonk, NY (US)

(72) Inventors: Layne A. Berge, Rochester, MN (US); John R. Dangler, Rochester, MN (US); Matthew S. Doyle, Chatfield, MN (US); Thomas W. Liang, Rochester, MN (US); Manuel Orozco, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 15/671,417

(22) Filed: Aug. 8, 2017

(65) Prior Publication Data

US 2019/0049750 A1 Feb. 14, 2019

(51) Int. Cl.
| | |
|---|---|
| *G02C 7/04* | (2006.01) |
| *G02C 7/08* | (2006.01) |
| *G02B 1/04* | (2006.01) |
| *G02F 1/1333* | (2006.01) |
| *G02F 1/1337* | (2006.01) |
| *G02F 1/137* | (2006.01) |
| *G02F 1/1334* | (2006.01) |

(52) U.S. Cl.
CPC ............ *G02C 7/049* (2013.01); *G02B 1/043* (2013.01); *G02C 7/081* (2013.01); *G02C 7/083* (2013.01); *G02F 1/133788* (2013.01); *G02C 2202/16* (2013.01); *G02C 2202/18* (2013.01); *G02F 1/1334* (2013.01); *G02F 2202/022* (2013.01); *G02F 2202/08* (2013.01)

(58) Field of Classification Search
USPC .................................................. 523/106, 107
See application file for complete search history.

(56) References Cited

U.S. PATENT DOCUMENTS

| | | | | |
|---|---|---|---|---|
| 6,517,203 | B1 * | 2/2003 | Blum ................. | C07K 14/5443 351/159.39 |
| 7,969,645 | B2 * | 6/2011 | Wik ........................ | G02B 3/08 351/159.03 |
| 8,579,435 | B2 * | 11/2013 | Blum ..................... | G02C 7/049 351/159.39 |
| 8,902,508 | B2 * | 12/2014 | Ponting ................. | G02B 1/041 359/652 |

(Continued)

FOREIGN PATENT DOCUMENTS

EP 3024082 A1 5/2016

OTHER PUBLICATIONS

"Electromechanical Effects in Electric EAP" (Section 5.10.1) from Bar-Cohen, Yoseph, "Electroactive Polymer (EAP) Actuators as Artificial Muscles: Reality, Potential, and Challenges", Second Edition, 2004.

*Primary Examiner* — Tae H Yoon
(74) *Attorney, Agent, or Firm* — Patterson+Sheridan, LLP

(57) ABSTRACT

An ophthalmic device is described that includes a frame and an optically active component comprising a bistable dielectric electroactive polymer. The bistable dielectric electroactive polymer changes shape when exposed to a sufficiently strong electric field and does not completely revert to its former shape when the electric field is deactivated. The refractive properties of the ophthalmic devices described herein are adjusted by exposing the devices to electric fields.

15 Claims, 4 Drawing Sheets

(56) References Cited

U.S. PATENT DOCUMENTS

| | | | |
|---|---|---|---|
| 9,377,629 B2 * | 6/2016 | Lee | G02B 27/2214 |
| 9,411,173 B1 | 8/2016 | Blum et al. | |
| 2003/0210377 A1 | 11/2003 | Blum et al. | |
| 2005/0231677 A1 | 10/2005 | Meredith | |
| 2006/0164593 A1 | 7/2006 | Peyghambarian et al. | |
| 2008/0208335 A1 | 8/2008 | Blum et al. | |
| 2010/0245761 A1 * | 9/2010 | Widman | B29D 11/00028 |
| | | | 351/159.41 |
| 2013/0135578 A1 | 5/2013 | Pugh et al. | |
| 2014/0152953 A1 | 6/2014 | Guillon et al. | |
| 2014/0340762 A1 * | 11/2014 | Blum | G02B 3/14 |
| | | | 359/666 |
| 2016/0231592 A9 | 8/2016 | Beaton et al. | |
| 2016/0377886 A1 * | 12/2016 | Quiroga | G02C 7/083 |
| | | | 349/13 |

* cited by examiner

DIELECTRIC ELECTRO-ACTIVE POLYMER CONTACT LENSES

BACKGROUND

The present invention relates to contact lenses and manufacture thereof, and more specifically, to electro-optical materials for use in contact lenses.

Contact lenses are useful for correcting vision in the human eye. The lenses are widely available over-the-counter as hard and soft lenses, which may be for daily disposal or long-term use. With the advance of materials for use generally in the human body, and specifically for the eye, features such as color, patterned focal properties, and features activated by embedded components, such as electrical components. Such features include changeable optical properties and even use of the contact lens as a display for information. For example, contact lenses have been reported that can change their dioptric power upon exposure to electric current.

Often, however, the human eye exhibits complex vision anomalies that require complex corrective measures, and such anomalies can change in complex ways over time. In such situations, contact lenses with complex capability to address such anomalies are needed.

SUMMARY

Embodiments described herein provide an ophthalmic device that includes a frame and an optically active component comprising a bistable dielectric electroactive polymer.

Other embodiment described herein provide an ophthalmic device that includes a frame and an optically active component comprising a first member and a second member, each of which comprises a bistable dielectric electroactive polymer selected from the group consisting of an acrylate polymer, a silicone, a thermoplastic polyurethane, and a polyester.

Other embodiments described herein provide methods of making an ophthalmic device that include embedding an optically active component comprising a bistable dielectric electroactive polymer inside a polymer frame.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1A:
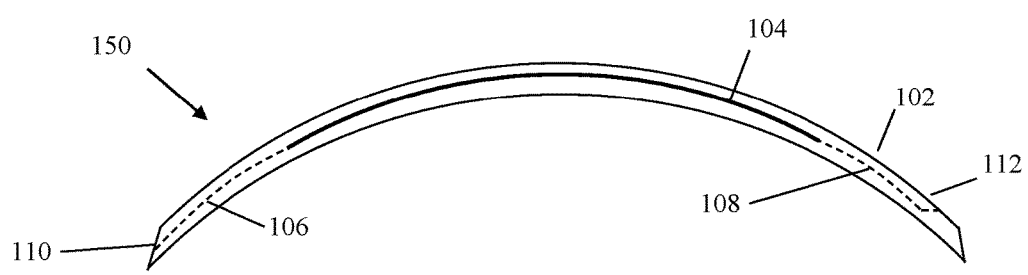
FIG. 1A is a schematic cross-sectional view of an ophthalmic device according to one embodiment

FIG. 1A is a schematic cross-sectional view of an ophthalmic device 100 according to one embodiment. The ophthalmic device 100 is built to be used in the human eye, much like a contact lens. The ophthalmic device 100 includes a frame 102 and an optically active component 104 embedded within the material of the frame 102. The frame is typically poly(methyl methacrylate) or silicone hydrogel. The optically active component 104 is a thin insert, which may be a film that comprises a bistable dielectric electroactive polymer (hereinafter "BDEP"). The active component 104 is arranged within the frame 102 generally parallel to the major surfaces of the frame 102. The BDEP is a polymer that changes shape when exposed to a sufficiently strong electric field and does not completely revert to its former shape when the electric field is deactivated. The polymer is thus structurally stable at a first configuration prior to application of an electric field and also at a second configuration different from the first configuration after exposure to the electric field. In some cases, the polymer may partially relax after the electric field is discontinued, but the polymer does not completely relax to it configuration before exposure to the electric field.

In some cases, the deformation can be reversed, at least in part, by applying an electric field of opposite orientation to that which created the deformation. For example, a first electric field having a first orientation, which may be a direction or a polarity, is applied to the polymer to create a deformation, which remains after the first electric field is discontinued, and then a second electric field having a second orientation opposite to the first orientation is applied to the polymer to reverse the deformation. After the second electric field is discontinued, the polymer may then have a structure substantially the same as before the first electric field was applied.

Deformation in the presence of an electric field may be enhanced for at least some BDEP's by heating the material. If the temperature of the material is increased to near or above its glass transition temperature, deformation can be dramatically enhanced. Following such treatment, before removing the electric field, the material temperature can be reduced to a temperature at which the material is mechanically stable, and then the electric field can be removed. Such methods may reduce the electric field strength needed to deform the material.

Deformation in the presence of an electric field may also be enhanced by pre-straining the BDEP material. A pre-strain is typically induced by stretching the material at a temperature near or above its glass transition temperature, and then fixing the stretched material to a rigid fixture of some kind. The rigid fixture may be a substrate with more rigidity than the pre-strained BDEP material to which the strained BDEP material is adhered. After pre-straining, the BDEP material is cooled to a temperature below its glass transition temperature to preserve at least a part of the induced strain.

Ophthalmic devices such as the device 100 are useful because the optically active component can be adjusted in situ by exposing the device 100 to an electric field. The optically active component changes to a new shape that substantially persists after removing the device 100 from the electric field. Such a device could be adjusted by an optometrist or ophthalmologist to a patient's particular prescription in the office while the patient waits. A "blank" could be mass-produced for easy customization at the provider's office, and a single device can be reconfigured over time as the patient's prescription changes.

Various polymers undergo deformation when exposed to electric fields. Many thermoplastic polymers will deform when exposed to electric fields of varying strength at ambient and/or elevated temperatures. Examples of such polymers include poly(t-butylacrylate), silicones, thermoplastic polyurethanes (i.e. urethane copolymers with thermoplastic components such as acrylates and polyesters), polyesters, and combinations thereof.

The deformation exhibited by a BDEP is generally directional in nature, and relates to the molecular structure of the material. A sheet of BDEP, for example, will typically respond to a given electric field by deforming in a first direction by a first amount. Depending on the structure of the electric field and the BDEP molecular structure, the BDEP may also deform in a second direction by a second amount, typically different from the first amount. A deformation ratio may be defined that compares deformation along two orthogonal axes in response to an electric field having standard properties. If an electric field of constant strength and polarity is applied to a BDEP, the BDEP may deform in a first direction A by an amount, or ratio, $\tau_A$ and in a second direction B, orthogonal to the direction A, by an amount, or ratio, $\tau_B$. The ratio of the two $\tau_A/\tau_B$ is a deformation ratio T that can be used to characterize the planar structural response of a BDEP to an electric field. The response can also be understood in terms of stress, with a stress ratio S that similarly describes stress change in two orthogonal directions in response to an electric field. The most useful of these ratios use the stable stresses or deformations after structural change has stopped, but ratios can be defined regarding maximum stresses and deformations before any partial relaxation occurs.

The polymeric BDEP materials described herein are typically amorphous in structure, and deform isotropically in a uniformly applied electric field. The materials described above generally respond to applied electric fields of 5-15 V/µm by deforming up to about 60% in directions perpendicular to the flux of the electric field. The electric field can be applied by placing the device 100 between two parallel plate electrodes and energizing the electrodes with DC or AC power. Alternately, electrodes, for example compliant conductive materials such as silicone greases, conductive polymers, and graphitic materials, can be adhered to the BDEP material to form electrodes separated by the BDEP material. In the case of ophthalmic devices such as the device 100, the optically active component or the frame can be coated on both major surfaces with a transparent conductive material, which may be a polymer, to provide an electrode for applying an electric field across the BDEP material. If the transparent conductive material is applied directly to the BDEP material, a portion of the transparent conductive material may extend to a surface of the device 100 to provide an external electrical connection. Transparent conductive polymers usable for the devices described herein include polyacetylenes, polyanilines, polypyrroles, and polythiophenes. Examples include poly(3,4-ethylenedioxythiophene), which may be doped with polystyrene, and poly(4,4-dioctyl cyclopentadithiophene). Molecular weight of the polymeric optically active components can be selected to be compatible with the material of the frame and provide enough strength to deform the frame when electrostatically stressed.

One example of a transparent conductive electrode includes a film of transparent conductive material applied directly to both major surfaces of the optically active component 104, including the BDEP material, and a contact portion 106, like a wire of transparent conductive material, extending outward through the frame 102 to an edge 110 thereof. The contact portion 106 is shown as a dashed line to denote an optional feature. Note that there will be one contact portion 106 for each film on each surface of the optically active component 104. Another contact portion 108 is shown, as an optional feature, extending from a film on a surface of the optically active component 104 through the frame 102 to a major surface 110, in this case the front (non-contact) surface of the device 100.

Figure 1B:
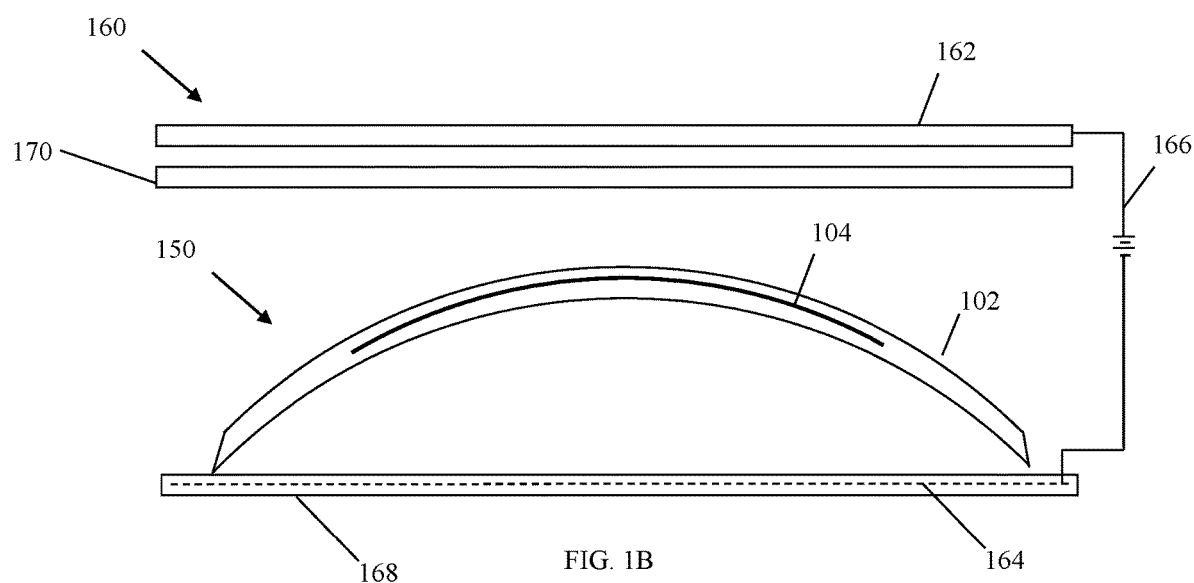
FIG. 1B is a schematic cross-sectional view of an ophthalmic device according to another embodiment.
Figure 2:
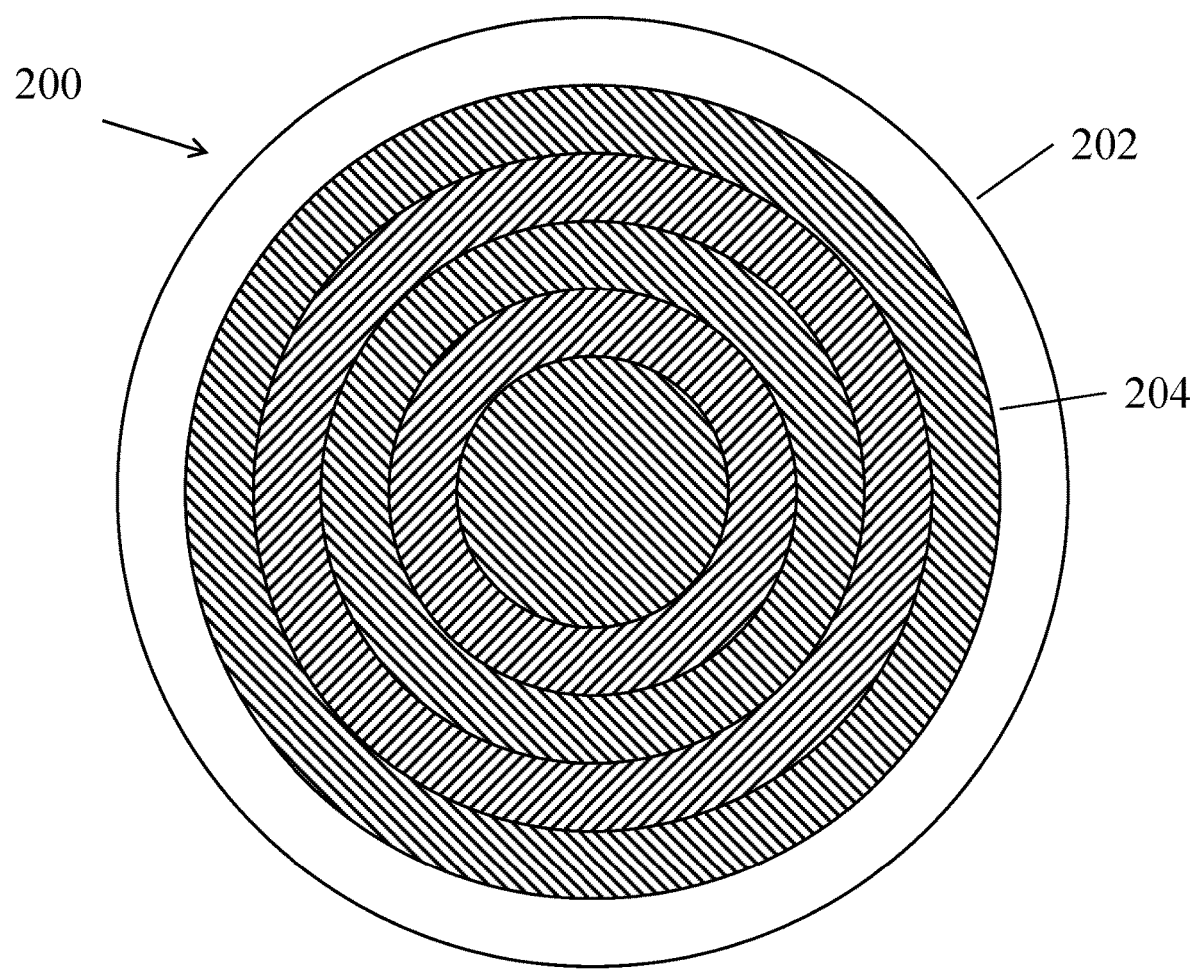
FIG. 2 is a top view of an ophthalmic device according to another embodiment.

Another way to apply an electric field to an ophthalmic device is shown in FIG. 1B, which is a processing view of an ophthalmic device 150, according to another embodiment. The ophthalmic device 150 is similar to the ophthalmic device 100, and is configured for use in the human eye, but no electrodes are included in the device 150. The device 150 includes the frame 102 and the optically active component 104. The processing system 160 includes two parallel-plate electrodes, a first electrode 162 and a second electrode 164, for creating an electric field oriented through the device 150. DC or AC power is applied to one or both plates to create a desired electric field between the plates. The device 150 is shown positioned on the second electrode 164 in FIG. 2, but the device may be positioned on a separate support that does not include, or function as, an electrode. In the processing system 160, the first electrode 162 is a monolithic conductive member coupled to a power circuit 166, which is shown in FIG. 2 as a DC circuit, but may be any suitable power circuit. The second electrode 164 is shown as embedded in a support 168, on which the device 150 is positioned. The second electrode 164 may be, in this case, a plate, a mesh, a grid, or a plurality of wires connected to the power circuit 166.

Optionally, a heating element 170 may be included in the processing system 160. The heating element 170 may include heat lamps, or other radiant sources such as LEDs, to direct radiant heat to the device 150, or a resistive heater embedded in the support surface, for example the support 168, on which the device 150 is positioned. Delivering heat to the device 150 while applying the electric field may increase the deformability of the device 150 at a given electric field, or may increase the speed at which the electric field deforms the device 150.

Application of an electric field oriented generally through the thickness of the device 100 causes the optically active component to strain in a generally transverse direction. The strain affects the curvature of the device 100, changing its optical properties. In this way, the refractive properties of the device 100, such as dioptric power, can be adjusted by applying an electric field to the device 100. The adjustment can be tailored by varying the strength of the electric field and by including mild heating of the device 100 to change the mechanical response to the electric field.

The optically active components described herein generally have a thickness that is a fraction of the overall thickness of the frame, such that a portion of the frame material covers the optically active component. The optically active component may be encapsulated by the frame, so a portion of the frame covers both major surfaces of the optically active component, or one surface of the optically active component may be exposed in some cases. Thinner optically active components will deform more under a given electric field, but will create less deforming force on the frame. A typical thickness of optically active components ranges from 5 µm to 50 µm.

Pattern effects can be achieved by different ways of constructing the optically active component. FIG. 2 is a top view of an ophthalmic device 200 according to another embodiment. The ophthalmic device 200 is also configured for use in the human eye. The ophthalmic device 200 includes a frame 202, much like the frame 102 of the device 100, and an optically active component 204. The optically active component 204 may be a patterned component, or may be made of a plurality of parts. In the device 200, the optically active component 204 includes a plurality of concentric members 206, each of which is made from, or includes, a BDEP. The BDEP may be the same in each member, or may be different in one or more members. Each of the concentric members 206 may have the same thickness and width, or one or more of thickness and width may vary among the concentric members 206. Since the strain that develops in a BDEP can depend on a dimension of the BDEP, it can be possible to produce more or less deformation, using different dimensions of concentric members 206, to achieve specific tuning response curves for an ophthalmic device such as the device 200.

For example, if a first BDEP component has a first thickness and a second BDEP component has a second thickness greater than the first thickness, if the first and second BDEP components are exposed to the same electric field, the first BDEP component will develop areal strain that is greater than that of the second BDEP component. When constrained by the frame 202, some electric field energy will manifest as stress in the BDEP material, and by mechanical reaction, in the frame, and some electric field energy will manifest as strain the BDEP material. These stresses and strains will be different for the first and second BDEP materials having different thicknesses, depending on the mechanical response of the material to the electric field. The shape and refractive properties of the device 200 can be locally adjusted by use of BDEP materials having different thickness or by mixing BDEP materials with different mechanical response characteristics.

Pattern effects can also be achieve through use of patterned energy. For example, the device 100 of FIG. 1 may be exposed to a patterned electric field to provoke different mechanical response in different parts of the optically active component 104. The patterned electric field may have a pattern of magnitude, frequency, and/or polarity that causes a different mechanical response in adjacent areas of the optically active component 104. In this way, non-linear refractive errors of the eye, such as astigmatism, can be corrected. Further, the exact shape of the optically active component 104, and the overall device 100, can be readjusted as the non-linearity of the eye changes merely by subjecting the device 100 to a new patterned electric field.

A patterned electric field can be applied by positioning a plurality of electrodes adjacent to the device 100 and applying different electrical energy to one or more of the plurality of electrodes. For example, a regular addressable array of electrodes may be positioned adjacent to the device 100, and a pattern of electric energy applied to the electrodes to give rise to a desired patterned electric field. A patterned electric field can also be applied by cyclic use of a single electrode at different parts of the device 100. For example, a field emitter tip may be positioned adjacent to a first portion of the device 100 and energized to apply a first local electric field to the first portion of the device 100. The emitter tip and the device 100 may then be moved relative to each other such that the emitter tip is adjacent to a second portion of the device 100. The emitter tip can then be energized again, using the same energy or different energy, to apply a second local electric field to the second portion of the device 100. In this way, the first and second portions of the device may be subjected to treatment by different electric fields to tailor the shape of the optically active component 104 at the first and second portions. Using such methods, the shape and optical properties, such as magnification and linear and non-linear refractivity, of the device 100 may be optimized repeatedly to a patient's changing diagnosis.

Figure 3A:
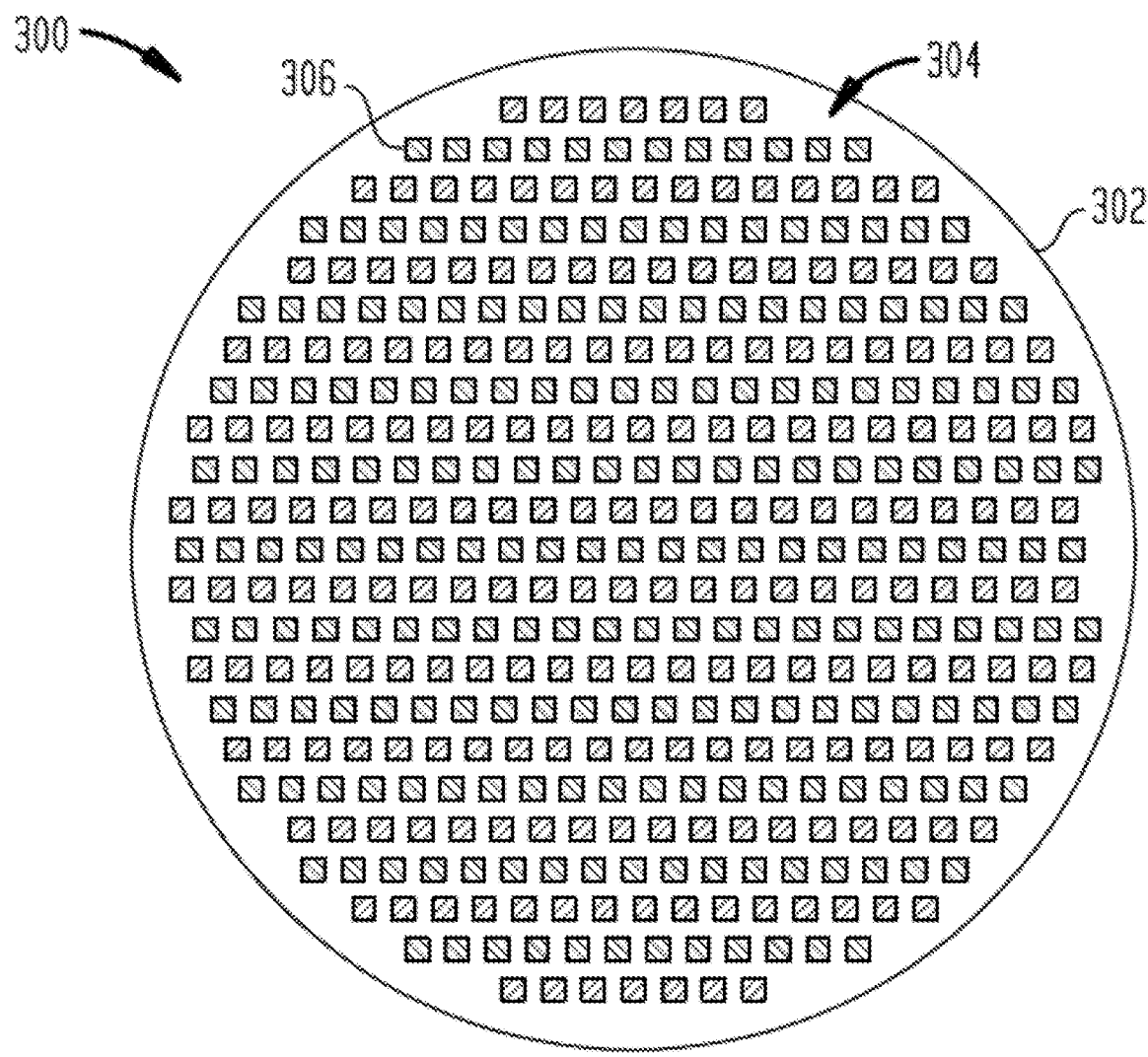
FIG. 3A is a top view of an ophthalmic device according to another embodiment.

FIG. 3A is a top view of an ophthalmic device 300 according to another embodiment. The ophthalmic device 300 is similar to the devices 100 and 200 in many respects, differing chiefly in the arrangement of the optically active component. The device 300 includes a frame 302 and an optically active component 304 that comprises a plurality of optically active parts 306. The optically active parts 306 are all made of, or include, a BDEP material. As shown in FIG. 3A, the optically active parts 306 are distributed through the frame 302, and are represented in this embodiment as small individual squares. The optically active parts 306 may take any convenient shape. All the optically active parts 306 may be the same BDEP material, or multiple materials may be used. In the embodiment of FIG. 3A, two different materials are used, alternating in rows of squares. The use of different BDEP materials may provide control over the shape response of the device 300 when exposed to an electric field. The use of multiple optically active parts 306 also provides the option to expose the different parts to electric fields of varying strength and/or duration to control the shape of the device 300.

The optically active parts 306 in FIG. 3A are shown arranged in rows, but other embodiments may have different arrangements. For example, in some embodiments, the optically active parts 306 may be arranged in concentric circles, with individual parts arranged along radial lines of the device 300, or not arranged along radial lines. In other embodiments, the optically active parts 306 may be uniformly distributed according to a random or quasi-random pattern.

The size and spacing of the optically active parts 306 may also be adjusted. In the embodiment of FIG. 3A, each optically active part 306 is about ⅓ mm in size, and spacing between optically active parts 306 is also about ⅓ mm. Larger or smaller size and spacing may be selected in particular embodiments, and size and spacing may vary in some embodiments. The optically active parts 306 may be arranged to overlap to any degree, as desired. An edge of two optically active parts may be arranged in contact with each other, and refractive effects may be minimized by merging the two parts into a single homogeneous part by thermal treatment.

Figure 3B:
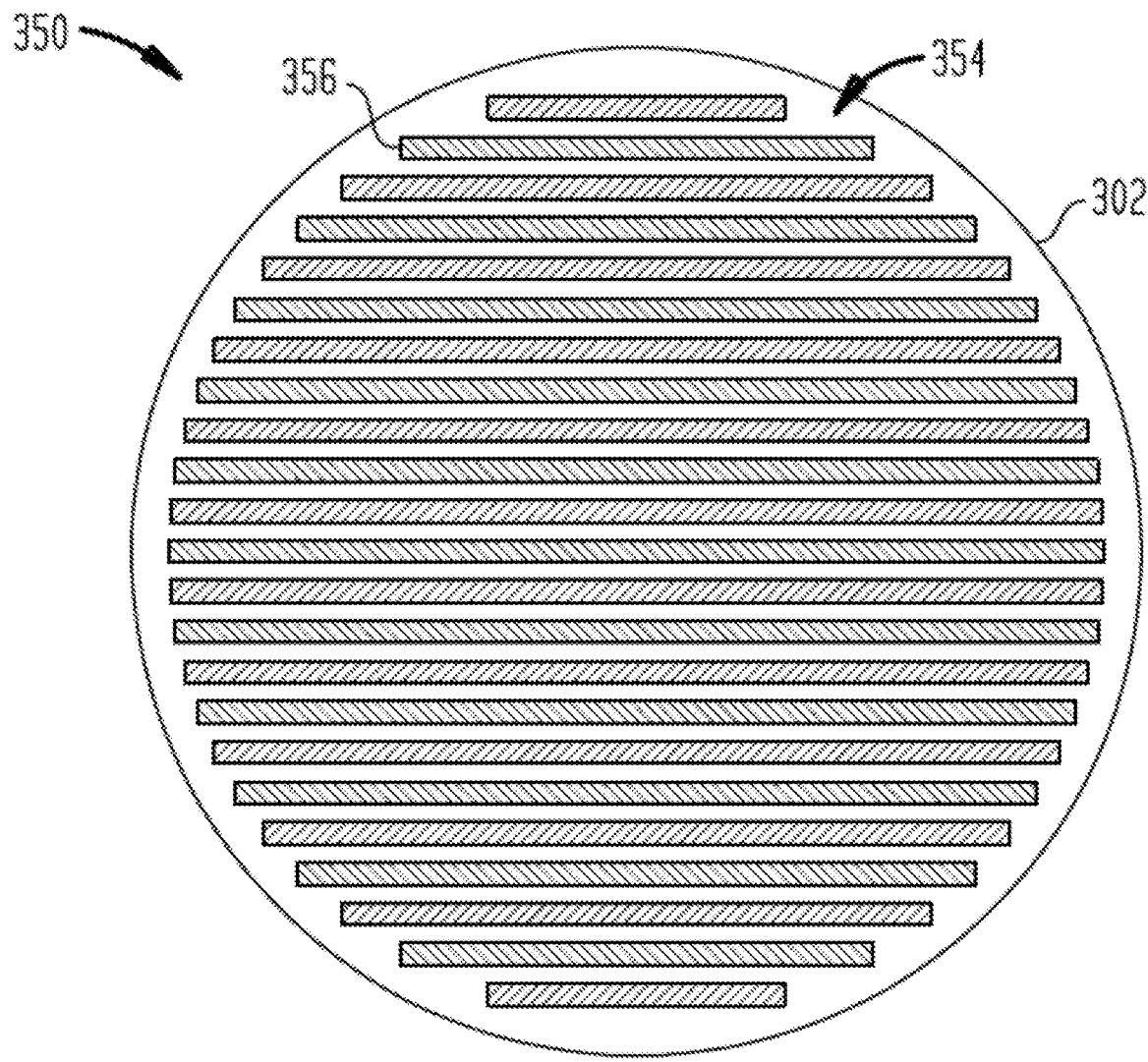
FIG. 3B is a top view of an ophthalmic device according to another embodiment.

FIG. 3B is a top view of an ophthalmic device 350 according to another embodiment. In FIG. 3B, the optically active components 356 are configured in stripes. Two different BDEP materials are shown, as in the embodiment of FIG. 3A, but other embodiments may have only one BDEP material, or more than two BDEP materials. The stripes are shown separated by an interval of about ⅔ the width of the stripes where the frame 302 has no optically active material. In other embodiments, the stripes may be closer to, or further from, each other, and in some cases the stripes may be arranged to overlap by any desired amount. Refractive effects may be minimized by merging two overlapping stripes into one homogeneous part by thermal treatment.

In addition to refractive behavior, optically active components may be used that have other optical effects. For example, optically active components may be included that have polarization activity that can be adjusted by exposing the material to an electric field. Gradient refractive index nanoscale polymer-dispersed liquid crystal materials may be used as BDEP materials in the optically active components of any of the devices described herein, and the polarization state of the materials tuned by exposure to electric fields, as described elsewhere herein. Such components may be included with shape changing components in some cases. Nematic, zenithal, smectic, and cholesteric bistable liquid crystal materials may be used in various embodiments, and may be dispersed in a polymer matrix to provide control over the optical change properties of the material. The polymer matrix may be selected to be compatible with the material of the frame. For example, a bistable liquid crystal material may be dispersed in a silicon hydrogel material for inclusion in a silicone hydrogel frame.

As described above, optically active components may be layered in an ophthalmic device. For example, a first optically active component having a first voltage threshold may be disposed at a first location in a frame, and a second optically active component having a second voltage threshold different from the first voltage threshold may be disposed at a second location in the frame, such that the first and second optically active components form two layers in the device. Each of the first and second optically active components may independently be a shape changing component or a polarization changing component. The shape changing component can be used to change the refractive properties of the device while the polarization changing component can independently be used to change the polarization properties of the device.

While the foregoing is directed to embodiments of the present invention, other and further embodiments of the invention may be devised without departing from the basic scope thereof, and the scope thereof is determined by the claims that follow.

What is claimed is:

1. An ophthalmic device, comprising:
  a frame; and
  an optically active component comprising a plurality of stripes each of which comprises a bistable dielectric electroactive polymer,
    the optically active component having a thickness of from about 5 μm to 50 μm, and
    the ophthalmic device having an eye contact surface, and the optically active component is free of a liquid crystal.

2. The ophthalmic device of claim 1, wherein the optically active component comprises a first member and a second member, each of which comprises a bistable dielectric electroactive polymer.

3. The ophthalmic device of claim 2, wherein the first and second members are each arranged substantially parallel to the eye contact surface.

4. The ophthalmic device of claim 3, wherein the first member is spaced apart from the second member.

5. The ophthalmic device of claim 1, wherein the bistable dielectric electroactive polymer is selected from the group consisting of an acrylate polymer, a silicone, a thermoplastic polyurethane, and a polyester.

6. The ophthalmic device of claim 1, wherein the bistable dielectric electroactive polymer is electrically deformable at temperatures below a glass transition temperature of the bistable dielectric electroactive polymer.

7. The ophthalmic device of claim 6, wherein the optically active component comprises a first member that includes a first bistable dielectric electroactive polymer and a second member that includes a second bistable dielectric electroactive polymer.

8. The ophthalmic device of claim 2, wherein the first member is substantially parallel to the eye-contact surface, the second member is substantially parallel to the eye-contact surface, and the first member is between the eye-contact surface and the second member.

9. The ophthalmic device of claim 2, wherein the first member and the second member form a pattern of alternating stripes.

10. An ophthalmic device, comprising:
  a frame; and
  an optically active component comprising a plurality of concentric members, the plurality comprising a first member and a second member, each of the first member and the second member having a different thickness, each of which comprises a bistable dielectric electroactive polymer selected from the group consisting of an acrylate polymer, a silicone, a thermoplastic polyurethane, and a polyester, wherein the bistable dielectric polymer is electrically deformable at temperatures below a glass transition temperature of the bistable dielectric electroactive polymer,
    the optically active component having a thickness of from about 5 μm to 50 μm, and
    the ophthalmic device having an eye contact surface, and the optically active component is free of a liquid crystal.

11. The ophthalmic device of claim 10, wherein the first member includes a first bistable dielectric electroactive polymer and the second member includes a second bistable dielectric electroactive polymer.

12. The ophthalmic device of claim 10, wherein each of the first member and the second member have a different width.

13. The ophthalmic device of claim 10, wherein the plurality of concentric members comprises individual parts arranged along radial lines.

14. The ophthalmic device of claim 11, wherein the first bistable dielectric electroactive polymer overlaps the second bistable dielectric electroactive polymer.

15. A method of making an ophthalmic device having an eye contact surface, comprising:

embedding an optically active component comprising a plurality of concentric members or stripes, each of which comprises a bistable dielectric electroactive polymer inside a polymer frame, the optically active component is free of a liquid crystal and has a thickness of from about 5 µm to 50 µm; and applying an electric field to the bistable dielectric electroactive polymer to create a deformation that remains after the electric field is discontinued.

* * * * *